US008634760B2

(12) United States Patent  (10) Patent No.: US 8,634,760 B2
Chang et al.  (45) Date of Patent: Jan. 21, 2014

(54) POLARIZATION RE-ALIGNMENT FOR MOBILE TERMINALS VIA ELECTRONIC PROCESS

(75) Inventors: Donald C. D. Chang, Thousand Oaks, CA (US); Frank Lu, Reseda, CA (US); Yulan Sun, Canoga Park, CA (US)

(73) Assignee: Donald C. D. Chang, Thousand Oaks ( * ) Notice: Subject to any disclaimer, the term of this patent is extended or adjusted under 35 U.S.C. 154(b) by 101 days.

(21) Appl. No.: 12/847,997

(22) Filed: Jul. 30, 2010

(65) Prior Publication Data

US 2012/0028572 A1  Feb. 2, 2012

(51) Int. Cl.
*H04H 20/74* (2008.01)

(52) U.S. Cl.
USPC .......................... 455/3.02; 455/12.1; 343/757

(58) Field of Classification Search
None
See application file for complete search history.

(56) References Cited

U.S. PATENT DOCUMENTS

| | | | | |
|---|---|---|---|---|
| 5,856,804 | A * | 1/1999 | Turcotte et al. | 342/371 |
| 7,103,385 | B2 * | 9/2006 | Takeuchi et al. | 455/562.1 |
| 7,123,876 | B2 * | 10/2006 | Wang et al. | 455/25 |
| 7,307,586 | B2 * | 12/2007 | Peshlov et al. | 343/700 MS |
| 7,379,707 | B2 * | 5/2008 | DiFonzo et al. | 455/12.1 |
| 7,526,249 | B2 * | 4/2009 | Waltman et al. | 455/12.1 |
| 7,596,354 | B2 * | 9/2009 | Schiff | 455/12.1 |
| 7,606,528 | B2 * | 10/2009 | Mesecher | 455/3.02 |
| 7,711,321 | B2 * | 5/2010 | DiFonzo et al. | 455/12.1 |

FOREIGN PATENT DOCUMENTS

FR  1303002  4/2003

OTHER PUBLICATIONS

R.G. Vaughan, J.B. Anderson; "Antenna Diversity in Mobile Communications;" IEEE Transactions on Vehicular Technology; Nov. 1987; pp. 149-172.
R.G. Vaughan; "Polarization Diversity in Mobile Communications;" IEEE Transactions on Vehicular Technology; Aug. 1990; pp. 177-186.
K. Aydin, T.A. Seliga; "Remote Sensing of Hail with a Dual Linear Polarization Radar;" Journal of Climate and Applied Meteorology; Oct. 1986; V. 25; pp. 1475-1484.

* cited by examiner

*Primary Examiner* — Nay A Maung
*Assistant Examiner* — Alejandro Rivero

(57) ABSTRACT

A system for allowing ground terminals, mobile or stationary, to dynamically and electronically re-align signal polarizations to match that of incoming signal polarizations from transmitting sources. An adaptive re-orientation technique utilizes a cost minimization function to determine the difference between actual orientation values and desired orientation values. Calculations of satellite and ground terminal orientations and bearings to create weighting components allow a mobile ground terminal to electronically realign itself to the signals of a transmitting source, thereby eliminating the need for physically re-orienting the antenna array through mechanical processes.

20 Claims, 2 Drawing Sheets

POLARIZATION RE-ALIGNMENT FOR MOBILE TERMINALS VIA ELECTRONIC PROCESS

BACKGROUND OF THE INVENTION

1. Field of the Invention

The present invention relates to the field of wireless communication systems and electronic processing and, in particular, transmission and reception architectures between a radio frequency (RF) receiver and transmitter. More specifically, but without limitation thereto, the present invention pertains to a communications system and method that allows mobile ground terminals, or smart antennas to, dynamically realign itself to the signal polarizations of a designated asset (primarily satellites) utilizing a cost optimization program, reuse frequencies via orthogonal polarization beams, and switch receiving polarizations between circular polarizations (CP) and linear polarizations (LP).

2. Description of Related Art

In wireless communications, satellite to ground terminal communication technologies are currently utilized in two different ways. Fixed Service Satellites (FSS) utilize satellites placed in geostationary orbit (GEO) transmitting and receiving signals from ground terminals that are fixed in position. Direct-to-Home (DTH) satellite dishes that serve to bring satellite-beamed television into private homes are an example of FSS. On the other hand, Mobile Service Satellites (MSS) rely on GEO satellites to transmit and receive signals to and from mobile terminals, such as a Global Positioning System (GPS) receiver in a car, boat, etc.

FSS and MSS are just two methods of wireless communications that utilize polarization diversity, each with differing applications and requirements. Polarization diversity has enabled the same frequency to be reused over the same spectra, allowing one frequency to transmit two or more distinct sets of information. This has proved to be beneficial to both RF communications and RF radar applications. RF transmissions are usually either circularly polarized (CP), or linearly polarized (LP). LP signals can be polarized either vertically (VP) or horizontally (HP). Additionally, CP signals can either be right-hand circularly polarized (RHCP) or left-hand circularly polarized (LHCP).

FSS systems typically employ a LP signals, as the ground receiver (terminal) is fixed, and there is no issue with the signals falling out of phase, interfering with each other, or unable to be received because the ground terminal does not move in relation to the satellite. On the other hand, due to the mobile nature of MSS platforms (such as a truck moving both directionally and spatially to the satellite), a CP signal offers a better option as it offers an omnidirectional radio wave signal that can be received and decoded regardless of the direction or spatial displacement of the terminal. However, there are some DBS (direct broadcast satellites) that utilize CP as well as LP signals.

Because of this, polarization alignment techniques are important on satellite communications to reduce interference due to misalignment of the orientations of transmission signals and received antennas either for large earth station antennas as well as the small aperture antennas found in VSAT (very small aperture terminals) and Direct-to-Home (DTH) services, such as those used for satellite-based television (e.g. DirecTV® or Dish® Network). Currently, the techniques used for polarization realignment are mechanical-based, using gimbals and tracks to physically rotate and re-orient the ground terminal to the satellite.

While mechanically driving the satellite receiver (also known as the ground terminal) is a practical method of re-orienting the dish to properly receive the RF signals, the gimbals and tracks pose a problem for mobile ground terminals. However, mobile ground terminals are limited in two important ways. The extra machinery necessary for mechanized terminal re-orientation adds unnecessary weight and complexity to these mobile terminals, when their chief aim is simplicity with low cost and weight. This is because these mobile terminals do not have the physical space or power requirements that the FSS systems have.

For the foregoing reasons, there is a need in satellite communications for a system to electronically re-orient, specifically but without limitation thereto, mobile ground terminal receivers to match the polarizations of satellite RF signals, thus removing the requirement of mechanically re-orienting the ground terminals. Furthermore, there is a need to create a system that allows mobile ground terminals to seamlessly switch between polarizations, allowing these mobile ground terminals to receive both circularly polarized RF signals as well as linearly polarized RF signals.

An embodiment of the present invention involves a dynamic improvement of how ground terminals receive RF signals from satellites by utilizing an electronic method of decoding transmitted RF signals from satellites, whether they are circularly polarized or linearly polarized. The proposed architecture will allow ground terminals, in particular mobile VSAT or DTV operators, to use satellite assets either with LP or CP satellites for their services. The ground terminals will dynamically realign itself via electronics, and not physically moving the receiver, to the polarizations of radiation from a targeted satellite.

SUMMARY OF THE INVENTION

The present invention provides a dynamic communication system suitable for allowing dynamic signal polarization realignment by ground terminals, specifically but with no limitation thereto, mobile ground terminals, realigning the signals to those of radiated and/or received signals by designated space assets, specifically satellites. These satellites may be in GEO (geostationary earth orbit), LEO (low earth orbit), and MEO (medium earth orbit) as well as in slightly inclined orbits from GEO orbits.

Due to the fact that satellites and mobile ground terminals are constantly in motion, the orientation of polarizations relative to one another between a user terminal and the targeted satellite must be known. Thus, the following information is needed for implementation of the polarization realignment:

1. Information on current locations and orientations of user terminals; and
2. Information on current orbital slots and orientations of targeted satellites.

More specifically, the present invention provides a means of electronically realigning polarizations of incoming and outgoing signals for mobile ground terminals via a cost minimization technique (or, an angle optimization process) comprising: a set of inputs, specifically an antenna array, electronically connected to an angle optimization process module, which in turn is connected to an angle rotation process module. This embodiment removes the requirement for a means of mechanically reorienting the ground terminal antenna array for continually matching the space asset's signal polarizations, as the processing for realignment is done electronically.

Accordingly, several advantages of one or more aspects are as follows: to provide a means of electronically realigning a ground terminal to match signal polarizations (regardless of whether they are CP or LP) to that of incoming or outgoing signals by a designated space asset, that do not need a mechanical means of realigning polarizations, and that can seamlessly switch between signal polarizations thus giving ground terminals the ability to communicate with different satellites, thus increasing the flexibility of ground terminals.

BRIEF DESCRIPTIONS OF THE DRAWINGS

The objects, features and advantages of the present invention will become better understood from the following detailed descriptions of the preferred embodiment of the invention in conjunction with reference to the following appended claims, and accompany drawings where:

DETAILED DESCRIPTION OF THE PREFERRED EMBODIMENT

The present invention relates to the fields of communication systems, and in particular, satellite to ground terminal communications. More specifically, but without limitation thereto, the present invention pertains to a communication system and method that dynamically realigns incoming and outgoing signal polarizations for ground terminals to those of designated space assets, specifically satellites.

In order to determine the orientation of polarizations relative to one another between a user terminal and a targeted satellite, the following knowledge is needed for implementation of dynamic polarization realignments:

1) information on current locations and orientations of user terminals 2) information on current orbital slots of targeted satellites.

Figure 1:
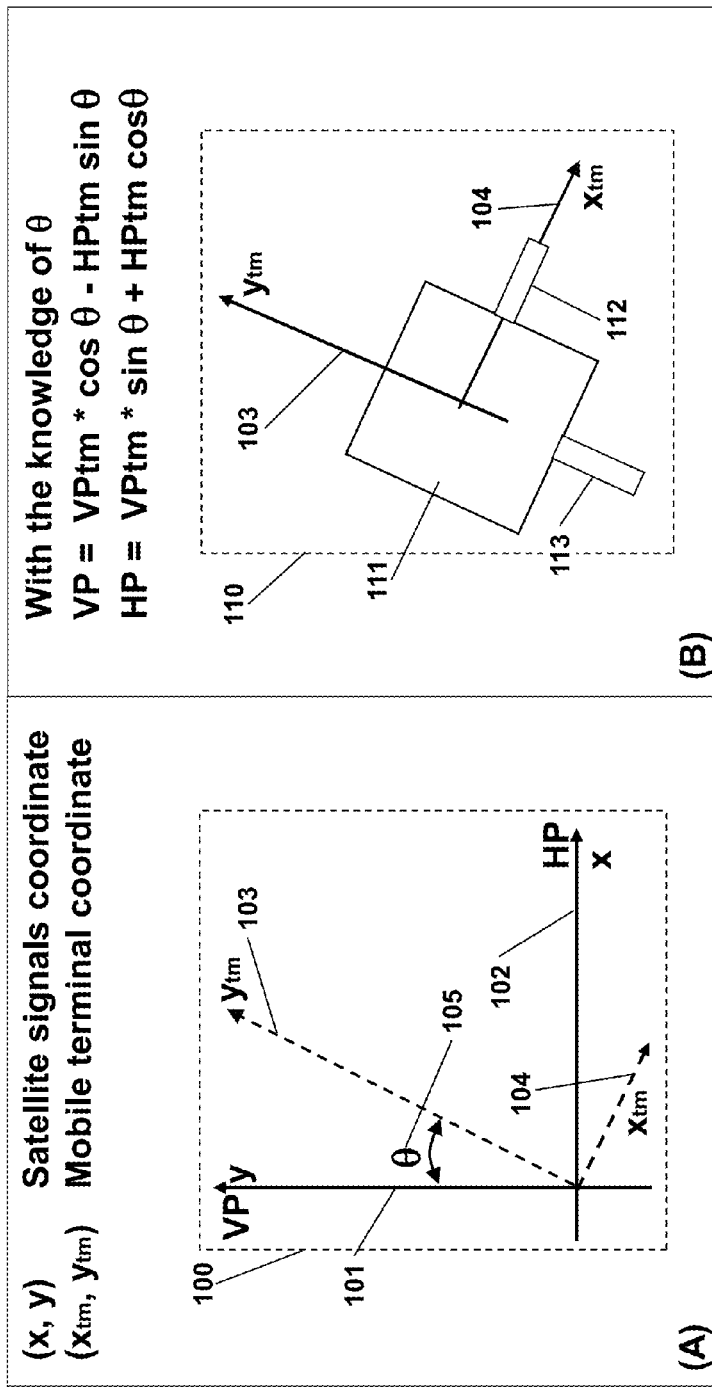
FIG. 1 shows two rectangular coordinates offed by a rotational angle $\theta$ for polarization realignments of signals between a transmitting source and a mobile user terminal.

The relative geometries are illustrated in FIG. 1, assuming both polarizations from satellite and users are LPs. (x,y) 102 and 101 are the coordinate for satellite signals, and $(x_{tm}, y_{tm})$ 104 and 103 are those for user terminals. For GEO satellites, it is common to orient the E-field of the HP to the "North" when the satellites are in orbit. Therefore, the offset angle, $\theta$, 105, can be roughly determined via an electronic compass on the mobile user terminal.

Figure 2:
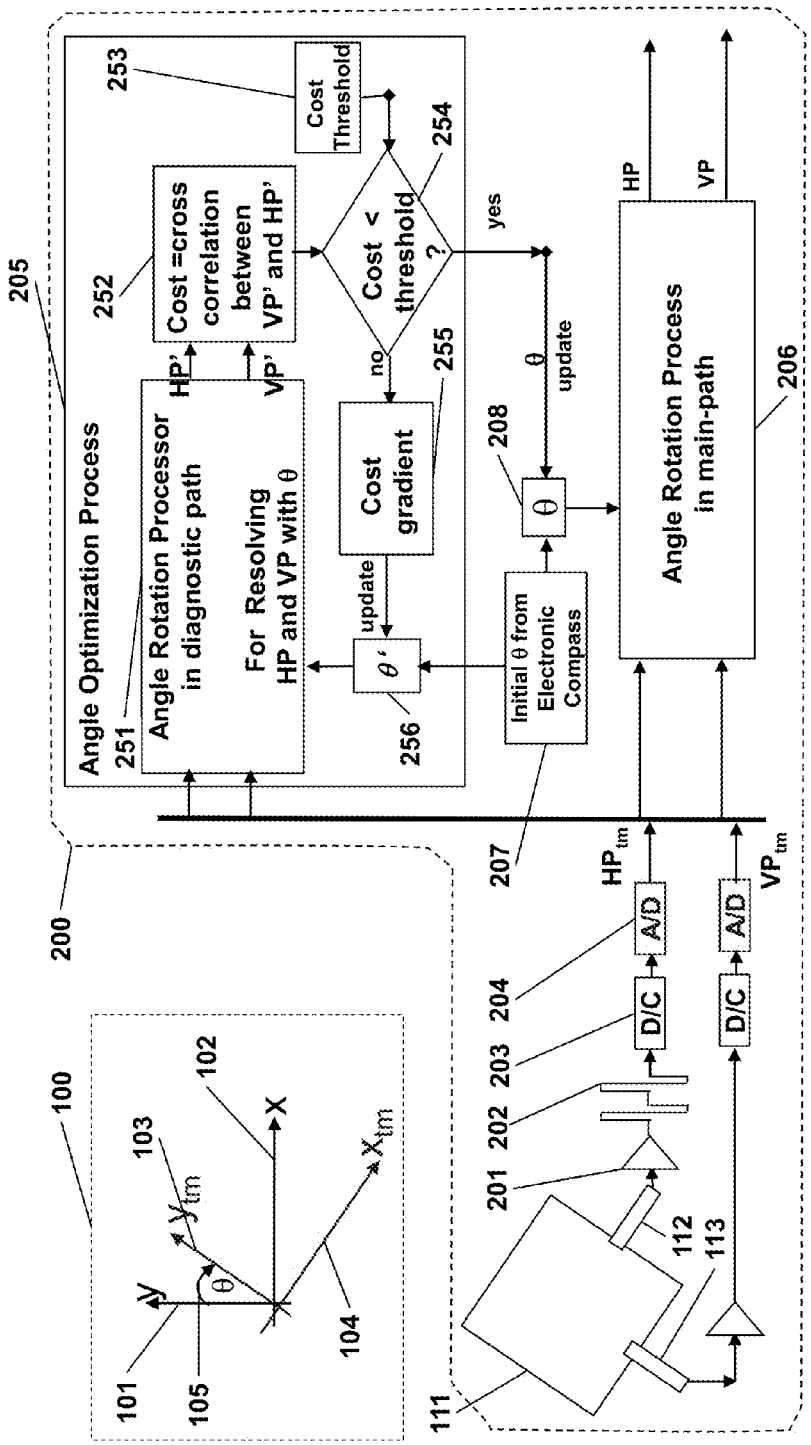
FIG. 2 shows a simplified block diagram of dynamic polarization re-alignment via cost minimization technique in a mobile receiving terminal.

The concept of linear polarization re-orientation to incoming signals ef for mobile terminals with a set of linearly polarized output ports comprising:

a. direct calculations of weighting components based on a rough knowledge of orientation of the terminals to a moving platform and bearing of the platform;

b. In order to achieve better isolation, it is possible to use an optimization loop to re-align the polarizations for the mobile terminals, as indicated in FIG. 2. Described as below:

In the current embodiment, a patch element 111 with two orthogonally polarized ports 112 and 113 is used to represent a receiving antenna array for mobile terminals in FIG. 2. As indicated in FIG. 2, the antenna array 111 has two orthogonal output ports, 112 and 113. The antenna array is oriented, as depicted in inset 100, to pick up HPtm by port 112 and VPtm by port 113. Each signal component goes through an amplifier 201, which boosts the strength of the signal.

The boosted signal then passes through a frequency down converter 203, then passing to an analog-to-digital (A/D) converter 204 to convert the analog signal into a digital one. Finally, the digital signals are replicated into two parallel paths, one for diagnostic processing through an angle optimization process module 205. The other path is for the main processing in the angle rotation process unit 206. Realignment calculations for both HP and VP signals are performed via equation (1) and (2), on a continuous sample-by-sample basis, with a known $\theta$ value.

Here, a process determines the difference of $\theta$ between (x,y) and (xtm, ytm). After determining the difference of $\theta$, the signals undergo a cost optmization program that determines the cross correlation between the VP and HP. This is compared with the initial $\theta$ from an electronic compass 207. Once the new optimal angle ($\theta$) is determined, information is sent to angle rotation process module 206 to electronically reorient antenna array 201 to receive the highest quality signal. In the angle optimization process module 205, first resolving the mixed signals to VP (vertical polarization) and HP (horizontal) polarization components according to the initial $\theta$ provided by compass, then calculating the cost by cross correlation between VP and HP, comparing the cost with a predefined threshold cost. If the cost is greater than the threshold, calculating the cost gradient will result in a new $\theta$. The loop continues until the cost is less than the threshold cost. The final $\theta$ will be delivered to the angle rotation process module and output better set of isolated VP and HP, at which point the signal polarizations are matching and the ground terminal will begin decoding the information.

The invention claimed is:

1. A method for angle realignment comprising:
   determining a first polarization offset angle between a first axis of a first coordinate for a terminal and a second axis of a second coordinate for a signal radiated by a satellite;
   obtaining a first vertical polarization component of said signal and a first horizontal polarization component of said signal based on information comprising said first polarization offset angle;
   calculating a cost based on information comprising a cross correlation between said first vertical polarization component of said signal and said first horizontal polarization component of said signal;
   comparing said calculated cost with a threshold cost;
   after said comparing said calculated cost with said threshold cost, calculating a cost gradient; and
   obtaining a second polarization offset angle based on said cost gradient.

2. The method of claim 1, wherein said first polarization offset angle has an accuracy between +6 degrees and −6 degrees.

3. The method of claim 1, further comprising said calculating said cost gradient in response to finding said calculated cost is greater than said threshold cost.

4. The method of claim 1, wherein said terminal comprises a mobile terminal.

5. The method of claim 1, further comprising said determining said first polarization offset angle via a compass.

6. The method of claim 1, wherein said signal comes from a signal path comprising an analog-to-digital converter.

7. The method of claim 1, further comprising obtaining information comprising a location and an orientation of said terminal.

8. The method of claim 1, further comprising obtaining information comprising an orbital slot and an orientation of said satellite.

9. The method of claim 1, further comprising obtaining a second vertical polarization component of said signal and a second horizontal polarization component of said signal based on information comprising said second polarization offset angle.

10. A method for angle realignment comprising:
  determining a first polarization offset angle between a first axis of a first coordinate for a terminal and a second axis of a second coordinate for a signal radiated by a satellite;
  obtaining a first vertical polarization component of said signal and a first horizontal polarization component of said signal based on information comprising said first polarization offset angle;
  calculating a cost based on information comprising a cross correlation between said first vertical polarization component of said signal and said first horizontal polarization component of said signal;
  comparing said calculated cost with a threshold cost;
  after said comparing said calculated cost with said threshold cost, obtaining a second polarization offset angle; and
  performing an angle rotation process to output a second vertical polarization component of said signal and a second horizontal polarization component of said signal based on information comprising said second polarization offset angle.

11. The method of claim 10, after said performing said angle rotation process, further comprising performing a decoding process.

12. The method of claim 10, further comprising said performing said angle rotation process in response to finding said calculated cost is less than said threshold cost.

13. The method of claim 10, wherein said terminal comprises a movable terminal.

14. The method of claim 10, further comprising obtaining information comprising a location and an orientation of said terminal.

15. The method of claim 10, further comprising obtaining information comprising an orbital slot and an orientation of said satellite.

16. A method for angle realignment comprising:
  determining a first polarization offset angle between a first axis of a first coordinate for a terminal and a second axis of a second coordinate for a signal radiated by a satellite;
  obtaining a first vertical polarization component of said signal and a first horizontal polarization component of said signal based on information comprising said first polarization offset angle;
  calculating a first cost based on information comprising a cross correlation between said first vertical polarization component of said signal and said first horizontal polarization component of said signal;
  comparing said first cost with a threshold cost;
  after said comparing said first cost with said threshold cost, calculating a cost gradient;
  obtaining a second polarization offset angle based on information comprising said cost gradient;
  obtaining a second vertical polarization component of said signal and a second horizontal polarization component of said signal based on information comprising said second polarization offset angle;
  calculating a second cost based on information comprising a cross correlation between said second vertical polarization component of said signal and said second horizontal polarization component of said signal;
  comparing said second cost with said threshold cost; and
  performing an angle rotation process to output a third vertical polarization component of said signal and a third horizontal polarization component of said signal based on information comprising said second polarization offset angle.

17. The method of claim 16, further comprising said calculating said cost gradient in response to finding said first cost is greater than said threshold cost.

18. The method of claim 16, further comprising said performing said angle rotation process in response to finding said second cost is less than said threshold cost.

19. The method of claim 16, wherein said terminal comprises a mobile terminal.

20. The method of claim 16, after said performing said angle rotation process, further comprising performing a decoding process.

* * * * *